G. D. HARRIS & J. S. POLLARD.
FOOD PRODUCT AND PROCESS OF PREPARING IT.
APPLICATION FILED NOV. 1, 1909.
1,017,411.  Patented Feb. 13, 1912.
2 SHEETS—SHEET 1.
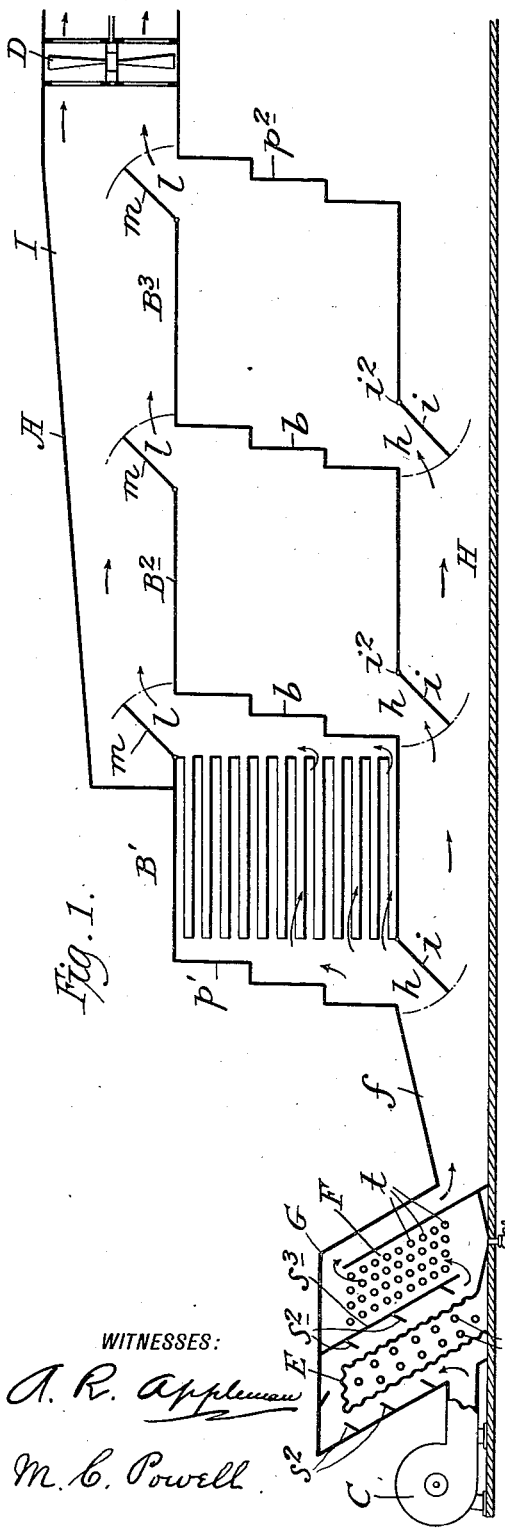
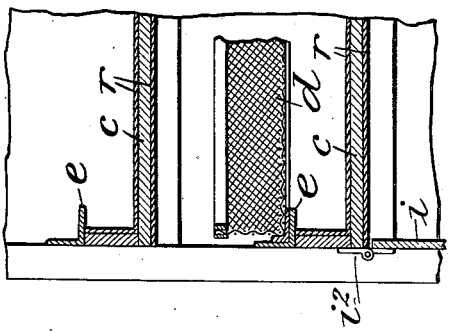
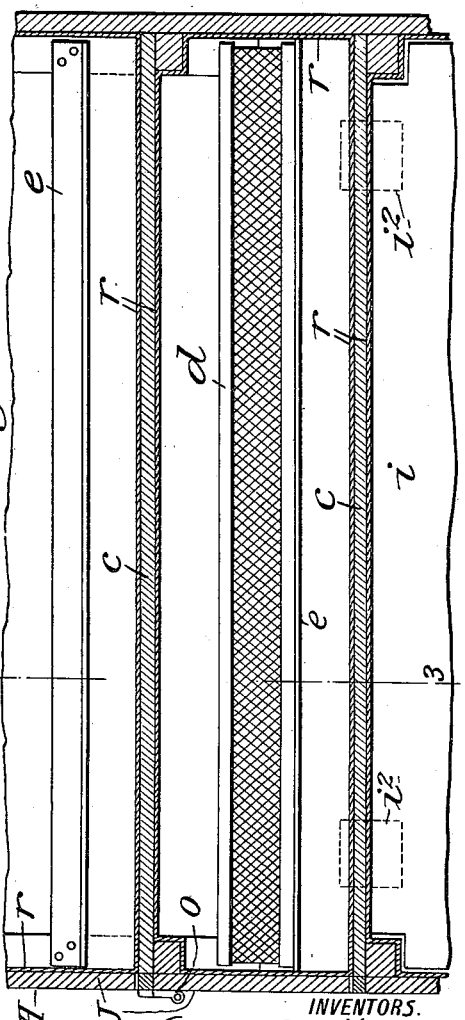
WITNESSES:
A. R. Appleman
M. C. Powell
INVENTORS.
GORDON DON HARRIS.
& JAMES S. POLLARD.
BY Griffin & Bernhard
ATTORNEYS

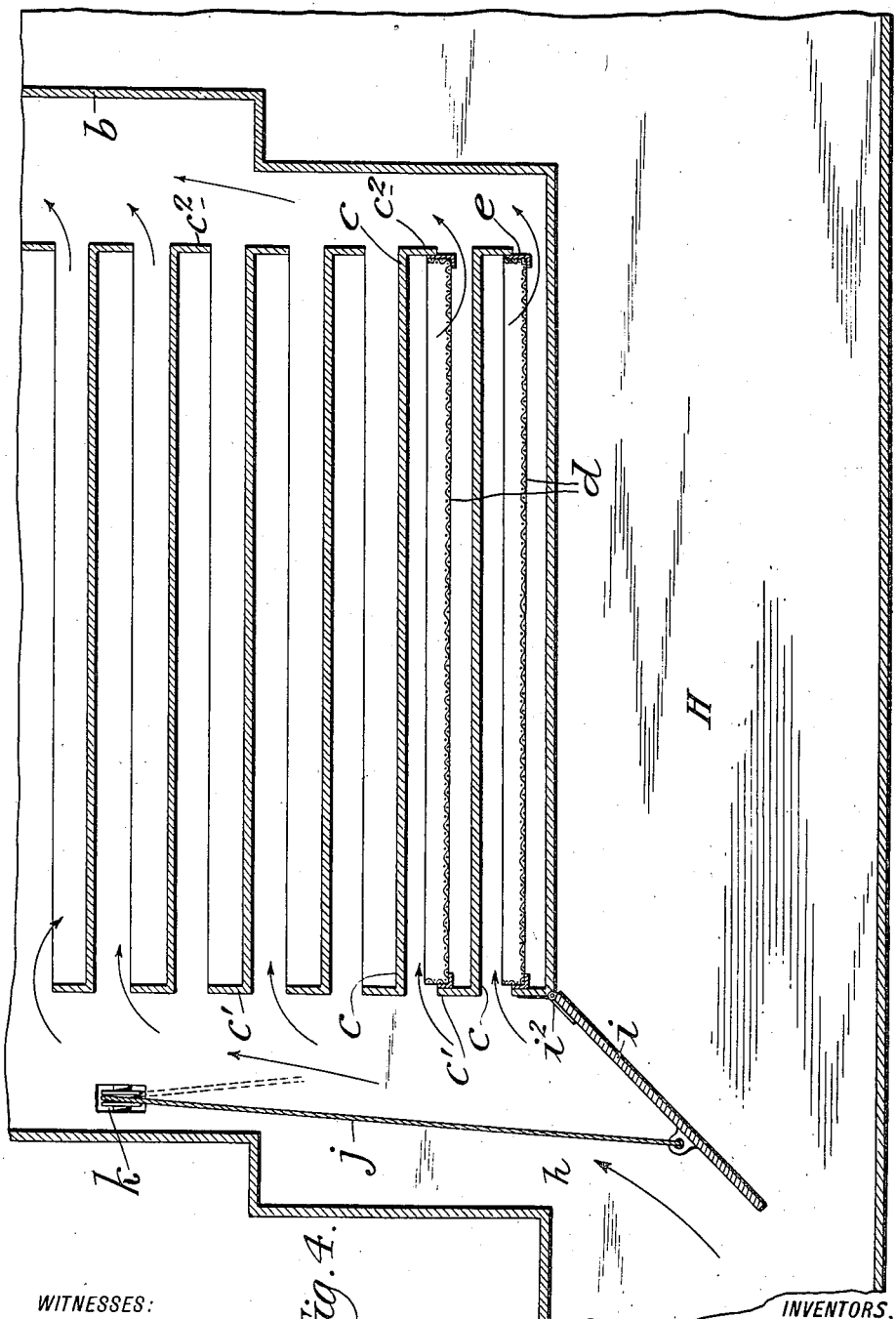

UNITED STATES PATENT OFFICE.

GORDON DON HARRIS, OF BAY SHORE, AND JAMES S. POLLARD, OF MAMARONECK, NEW YORK, ASSIGNORS, BY MESNE ASSIGNMENTS, TO GENERAL DEHYDRATOR COMPANY, A CORPORATION OF NEW YORK.

FOOD PRODUCT AND PROCESS OF PREPARING IT.

1,017,411.      Specification of Letters Patent.      Patented Feb. 13, 1912.

Application filed November 1, 1909. Serial No. 525,675.

*To all whom it may concern:*

Be it known that we, GORDON DON HARRIS, a citizen of the United States, residing at Bay Shore, Suffolk county, Long Island, and State of New York, and JAMES S. POLLARD, a citizen of the United States, residing at Mamaroneck, Westchester county, and State of New York, have jointly invented certain new and useful Food Products and Process of Preparing Them, of which the following is a specification.

This invention relates to new food products prepared from bananas, and, also, to the process of making such products.

The first important feature of the process consists in a method of dehydrating bananas under such conditions that the residuary or food constituents thereof retain substantially all the characteristics of bananas, such as taste, odor, nutritive value, etc., but, owing to the elimination of the aqueous constituents, such characteristics are more pronounced. The dried bananas may be used as a constituent of mince meat, puddings, and other combination food products, or they may be made into a confection by applying a suitable coating or covering thereto such as glacé, chocolate, etc.

The invention embodies, also, a special and valuable method of treating bananas for producing banana coffee, whereby a novel product results, which not only closely simulates natural coffee in appearance, palatableness, and other general characteristics, but is free from the injurious constituents of coffee, such as caffein, and, moreover, is highly nutritious.

It is well established that decay or deterioration will not take place in fruits or vegetables in the absence of moisture, and one part of the present process is aimed at removing from bananas the watery constituents on which decay depends, and, moreover, to eliminate this watery element so rapidly, and under such other conditions, that the residuary constituents of the fruit remains practically unchanged.

A salient feature of our process consists in effecting the dehydration of bananas by air which has been freed of the moisture normally contained therein by first cooling said air to such degree that said moisture condenses, then trapping out the condensed water, and then heating said air to the proper degree required. In practice it has been found advantageous to alternately cool and heat the air, for several cycles, in order to remove substantially all the water contained therein.

Another feature of the invention consists in delivering the dried and heated air to the apparatus, and in removing the outgoing current therefrom, after it has acted upon the bananas being treated, under such conditions that a slight pressure is at all times maintained in the apparatus, and, moreover, to equalize this pressure in all parts of the apparatus. This results in the production of a very uniform product, which, commercially, is a very decided advantage.

Another feature of our process which we have found of great advantage, not only in expediting the process, but in improving the quality of the resulting dried bananas, consists in simultaneously forcing the air into close and intimate contact with all parts of the fruit being treated, and, with this object in view the bananas are placed in trays having bottoms of coarse mesh, and the air forced through said bottoms and the material confined thereon.

A further element of novelty in our process consists in proportioning the volume of air employed in accordance with the aqueous contents of the particular material being dehydrated. It has been attempted heretofore to eliminate moisture from air in treating foods by passing the said air through or over some hygroscopic substance, such as calcium chlorid, sulfuric acid, etc., but this method is expensive and inefficient, and in practice, has never proven of any commercial value.

The following table shows substantially the weight of aqueous vapor contained in one hundred cubic feet of air saturated therewith, at the temperature specified.

At 50 degrees Fahrenheit __ .936 ounces
" 70 " " __ 1.826 "
" 90 " " __ 3.386 "
" 113 " " __ 6.488 "
" 131 " " __ 10.350 "

In practicing the invention we endeavor to deliver the heated air to the apparatus in which our process is being carried out at a temperature of substantially 61 degrees (F.) higher than the outside air. For example, if the outside air has a temperature of 70 degrees (F.), we would heat it to substantially 131 degrees (F.) prior to its introduction into the dehydrating apparatus. Assuming that the air at 70 was saturated with moisture, one hundred cubic feet thereof would carry 1.826 ounces of moisture, and by raising the temperature thereof to 131 degrees, it would carry, when saturated, 10.350 ounces of moisture, or an increase, due to the elevation of temperature, of substantially, 8.5 ounces. In other words, under the conditions specified, each 100 cubic feet of air would remove from the food products, theoretically, $8\frac{1}{2}$ ounces of moisture. In practice, however, in order to thoroughly eliminate the water so rapidly that the bananas are not otherwise changed from their natural condition, we employ, as a rule, about 90% more air than the theoretical quantity above specified.

The amount of water or aqueous constituents in all edible fruits and vegetables being known, or capable of determination, it being substantially 75 per cent., the volume of air necessary to employ in practicing our process can be readily calculated.

The apparatus employed in practicing the present invention embodies the features of construction and operation disclosed in our prior application filed by us on July 16, 1909, Serial No. 507,906.

In the accompanying drawings, we have illustrated one practical embodiment of an apparatus for practicing our invention, but the construction shown therein is to be understood as illustrative, only, and not as defining the limits of the apparatus which we may employ.

Figure 1 shows a longitudinal diagrammatic view, centrally of the apparatus, with certain elements shown in elevation; Fig. 2 is a partial, longitudinal sectional view, showing, particularly, a tray, the manner of supporting the same, and the arrangement of partitions above and below it; Fig. 3 is a fragmentary cross sectional view taken on line 3—3 of Fig. 2; and Fig. 4 is a partial, longitudinal sectional view, on an enlarged scale, through a tier or series of trays, and showing, also, the air inlet and exit thereto.

In the drawings, A, represents the main or outer casing of the dehydrating apparatus which is divided into a plurality of chambers, $B'$, $B^2$, and $B^3$, by means of partitions, $b$, preferably constructed in a step-up form, for reasons hereinafter stated. The number of chambers, may, of course, be regulated as desired. Each of the chambers, $B'$ to $B^3$ is divided into a series of compartments by horizontal partitions, $c$, which may be composed of wood protected by a metal facing, $r$, and supported in each of these compartments is a foraminous tray, $d$, the bottom of which is of coarse mesh, adapted to contain the fruit to be treated. The trays, $d$, are supported at their sides by angle-irons, $e$, running crosswise of the main casing and so positioned with reference to the horizontal partitions, $c$, that a free space, preferably equal in height to that of the tray, is provided above and below said tray, so as to permit the free passage of air through the tray. It will be noted that partitions, $c$, have a bent-up member, $c'$, at one end thereof, and a turned-down member, $c^2$, at the opposite end, and that said members are so positioned with reference to the trays as to preclude the passage of air through the apparatus, when the trays are located therein, without compelling it to pass through the foraminous bottoms of the trays, and, consequently, be forced into intimate contact with all parts of the material being operated upon.

Air is forced into the apparatus by means of a blower, C, and exhausted therefrom by means of a second blower, D. The air after having passed through the blower, C, is brought into contact with an air cooling device, E, provided with circulating pipes, $s$, through which a suitable refrigerant may be circulated. Baffles, $s^2$, extend from one side of casing, G, and from partition, $s^3$, and are so inclined as to direct the current of air toward, and cause it to impinge on, the outer surface of cooler, E. We have not deemed it necessary to describe specific details of the cooler, since devices of this character are well known. The air having been dehydrated, it enters heater, F, and is brought into contact with the heating pipes, $t$, therein, and its temperature regulated as desired. It will be understood that the coolers and heaters may be duplicated, as is found necessary, and the air alternately cooled and reheated, in order to thoroughly eliminate the moisture therefrom. The outlet, $f$, from casing, G, leads the dehydrated and warm air to a trunk or main, H, from which it passes to the chambers, $B'$ to $B^3$ containing the several series of trays, through the openings, $h$. These openings, $h$, are cortrolled by dampers, $i$, pivoted at $i^2$, and these may be regulated by a cord or cable, $j$, passing over a pulley, $k$, thence extending exteriorly of the casing to a convenient location for operation. Each of the chambers, B' to B³, is provided with an exit, $l$, opening into a common air tapering exhaust flue or trunk, I, in the end of which is located the exhausting fan, D, to which reference has been previously made. The exits, $l$, are controlled by dampers, $m$, similar to dampers, $i$, hereinbefore described, and which may be operated in the same way as dampers $i$, by suitable cables and pulleys. Access may be had to the several chambers, B' to B³, for the purpose of introducing and removing the trays, $d$, therefrom, through the medium of the pivoted doors, J, located in the sides of the casing, A. These doors are provided with latches, $o$, and although the number and size of such doors may be regulated as desired, it is preferred to have a separate door for each tray.

By constructing the end members, $p'$ and $p^2$ of the casing and the partitions, $b$, in step-up form shown in the drawings, and hereinbefore referred to, it will be observed that the air inlet to each series or tray tapers upward, i. e., it is larger at the bottom, and that the exhaust therefrom tapers downward, i. e., it is larger at the top. By constructing the end members and partitions as described the course of air through the apparatus is facilitated, and the horizontal portions of the members, $p'$, $b$, act as barriers in such manner that each of the chambers receives its proper proportion of air. That is to say, the pressure of the air is equalized throughout the apparatus, and each tray receives its right quota of air. Moreover, as the air escapes from the chambers B' to B³, containing the trays, it passes directly into the tapering exit trunk or flue, I, without being permitted to enter any other tray-containing chamber, whereby each series of trays necessarily receives freshly heated air, and the entry thereto of air which has become laden with moisture is precluded.

The frame work of the apparatus, and the outer casing, are preferably made of wood, but in practice it has been found desirable to line the interior thereof, including the partitions and in-take and out-going trunks, with galvanized iron, $r$, for the purpose of providing a smooth and sanitary surface on the interior of the apparatus.

In practice we have found it desirable and advantageous to have the in-going air enter the apparatus at a pressure of about three ounces, and to allow it to escape therefrom at a pressure of about two ounces, thereby maintaining a slight pressure in the apparatus at all times during the operation.

In case the bananas are to be used as a confection, they are prepared preliminarily to dehydrating, by first removing the skins, then quartering them lengthwise, and then slicing them. The sliced bananas having been dehydrated as described, the dried slices may be candied so as to produce a glace fruit, or may be covered with chocolate or other desired coating.

If the dehydrated bananas are to be used in mince meat, puddings, fruit cake, etc., the skins are removed from fresh bananas, whereupon they are quartered lengthwise and then dehydrated. The dehydrated fruit is then cut to a size of large raisins. Bananas dried in this manner are not only nutritious and palatable, but form an ideal fruit laxative.

In the case of treating bananas, for the purpose of making banana coffee therefrom, the bananas are cut into pieces with the skins thereon, and the entire product, i. e., skins and fruit, dehydrated. The dehydrated product is then roasted, similarly to coffee, until it becomes brown (i. e., the bananas are caramelized to some extent) and crisp. To each fifty pounds of this crisp product, we add about three pounds of water, which is readily absorbed, and then grind the product to the desired size, whereupon it is ready for packaging and use in substantially the same way as coffee.

It will be observed that in the foregoing treatment of bananas for the preparation of banana coffee, we not only utilize the food content of the banana skins, but we have found that the retention of the skins produces a superior product, both physically and dietetically, than can be obtained from the fruit without the skins.

It will, of course, be understood that slight modification may be made in the process described, as well as in the mode of operation of the apparatus set forth, without departing from the spirit or substance of our invention.

Having thus fully described the invention, what we claim as new and desire to secure by Letters Patent is:

1. In the art of dehydrating foods, the process which consists in cutting entire bananas, including their skins, into small pieces, and then dehydrating said pieces by subjecting them to the action of warm dehydrated air.

2. In the art of dehydrating foods, the process which consists in cutting entire bananas, including their skins, into small pieces, dehydrating said pieces by subjecting them to the action of warm dehydrated air, then roasting the dried product.

3. In the art of dehydrating foods, the process which consists in cutting bananas into small pieces, including their skins, then dehydrating said pieces, and then roasting them.

4. In the art of dehydrating foods, the process which consists in cutting bananas into small pieces, including their skins, then dehydrating said pieces, then roasting them, mixing water therewith, and finally grinding the product.

5. As a new article of manufacture, dehydrated banana fruit and skins the sugar content of which is partially caramelized so that the product has a coffee color.

In testimony whereof we have signed our names to this specification in the presence of two subscribing witnesses.

GORDON DON HARRIS.
JAMES S. POLLARD.

Witnesses:
H. I. BERNHARD,
JAS. H. GRIFFIN.